June 16, 1964 T. F. DONOHUE ETAL 3,137,129
CLUSTERED ENGINE INLET
Filed June 6, 1961 4 Sheets-Sheet 1
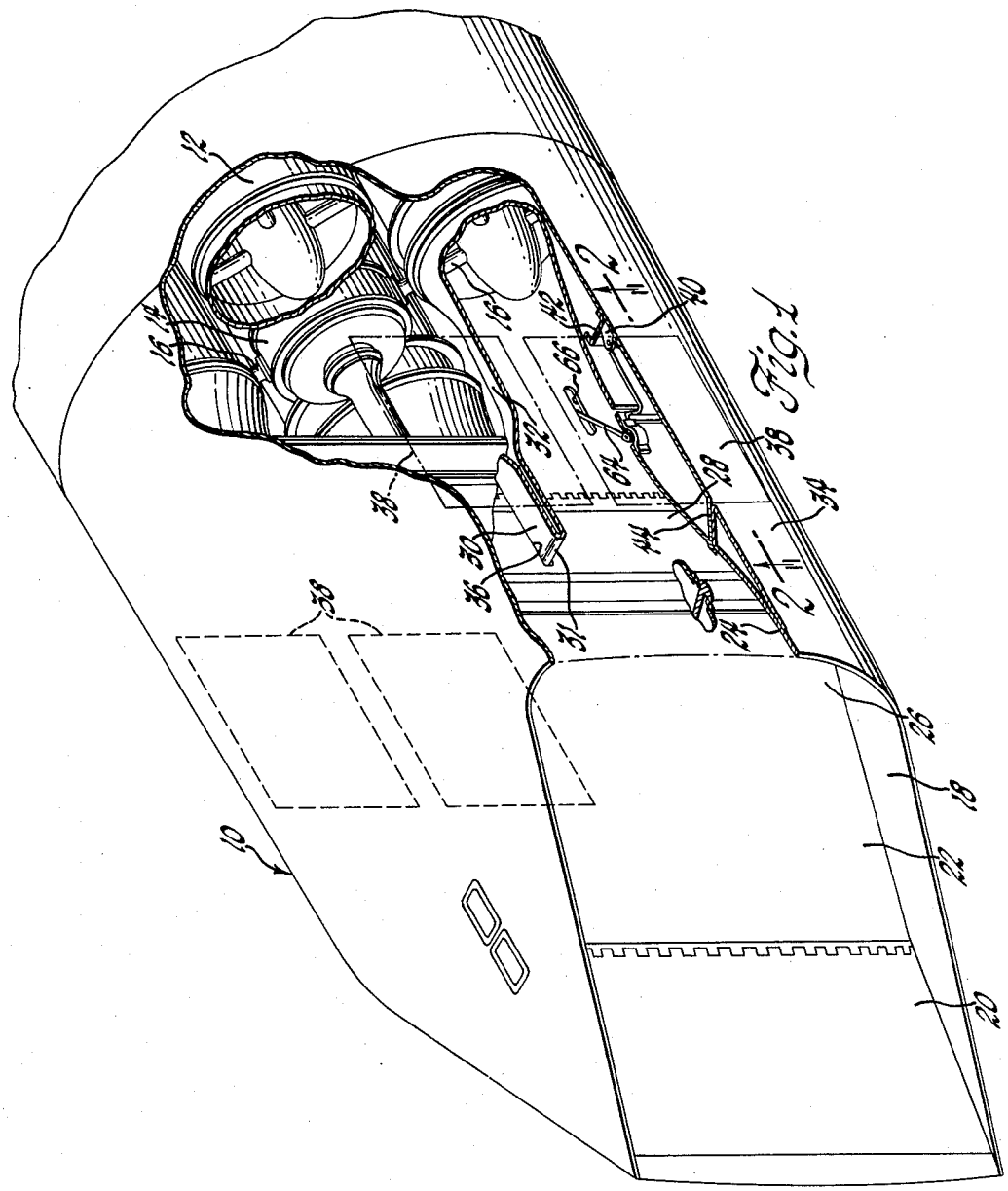
INVENTORS
Thomas F. Donohue &
BY Charles W. Schade
Robert E. McCollum
ATTORNEY

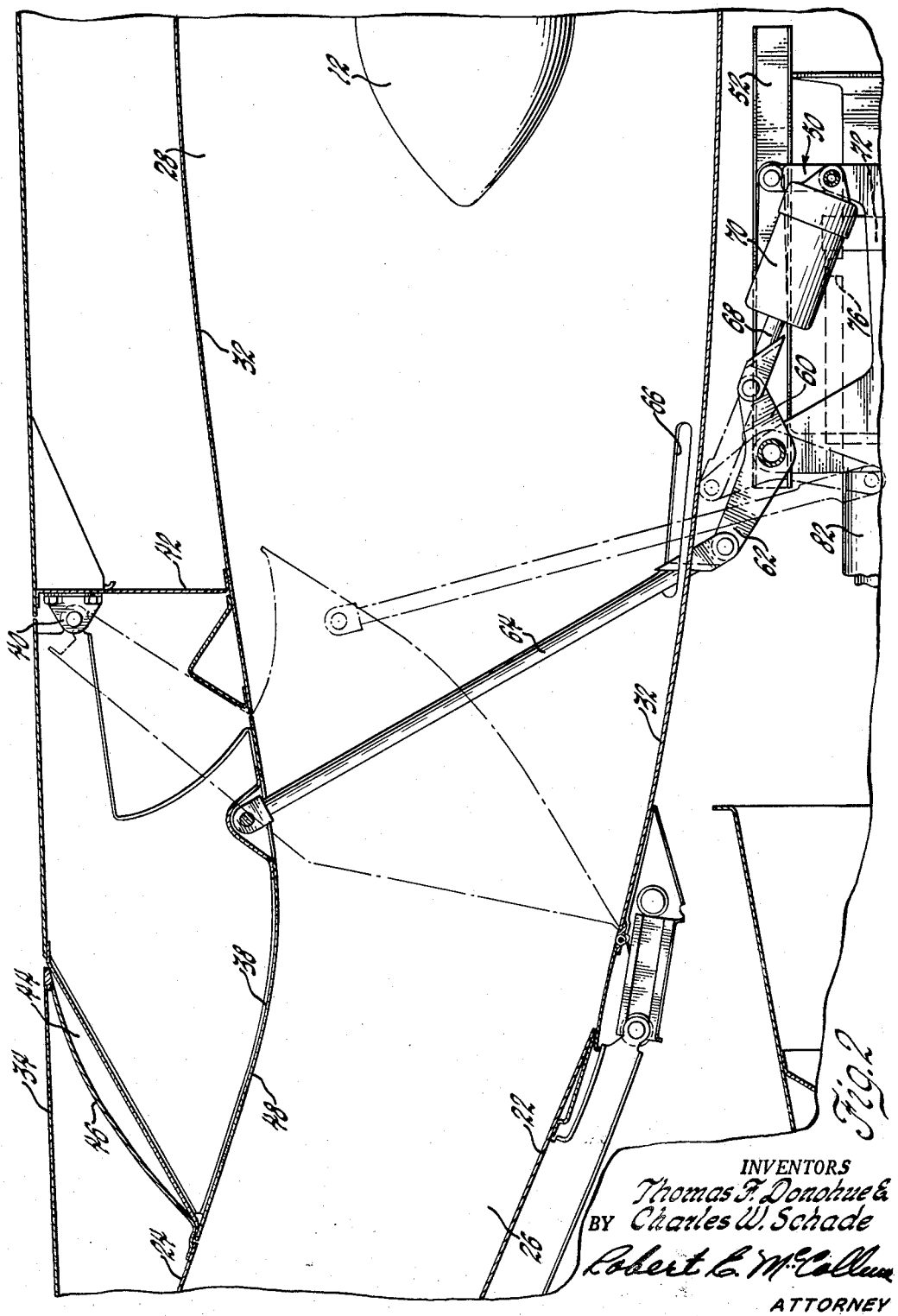

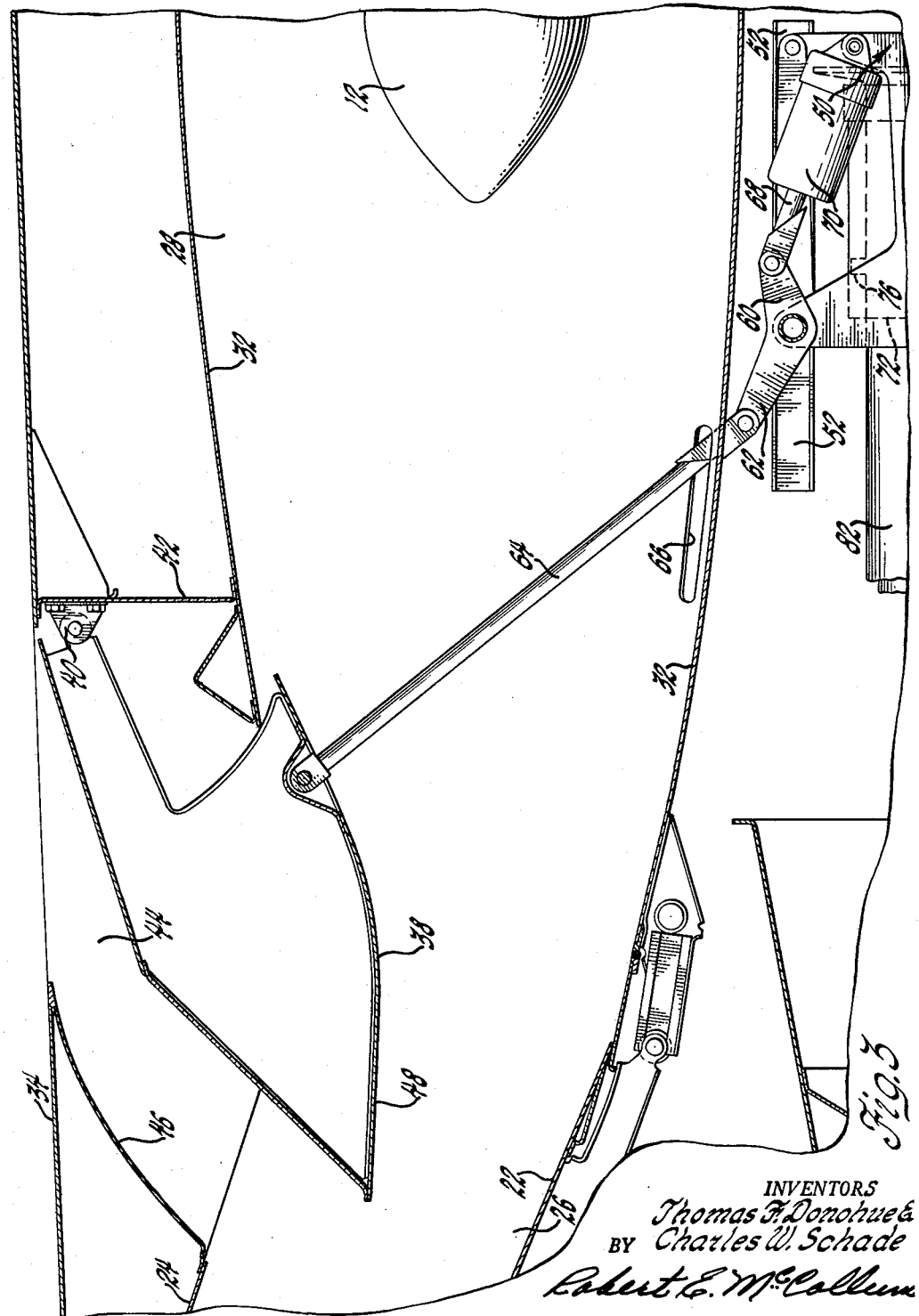

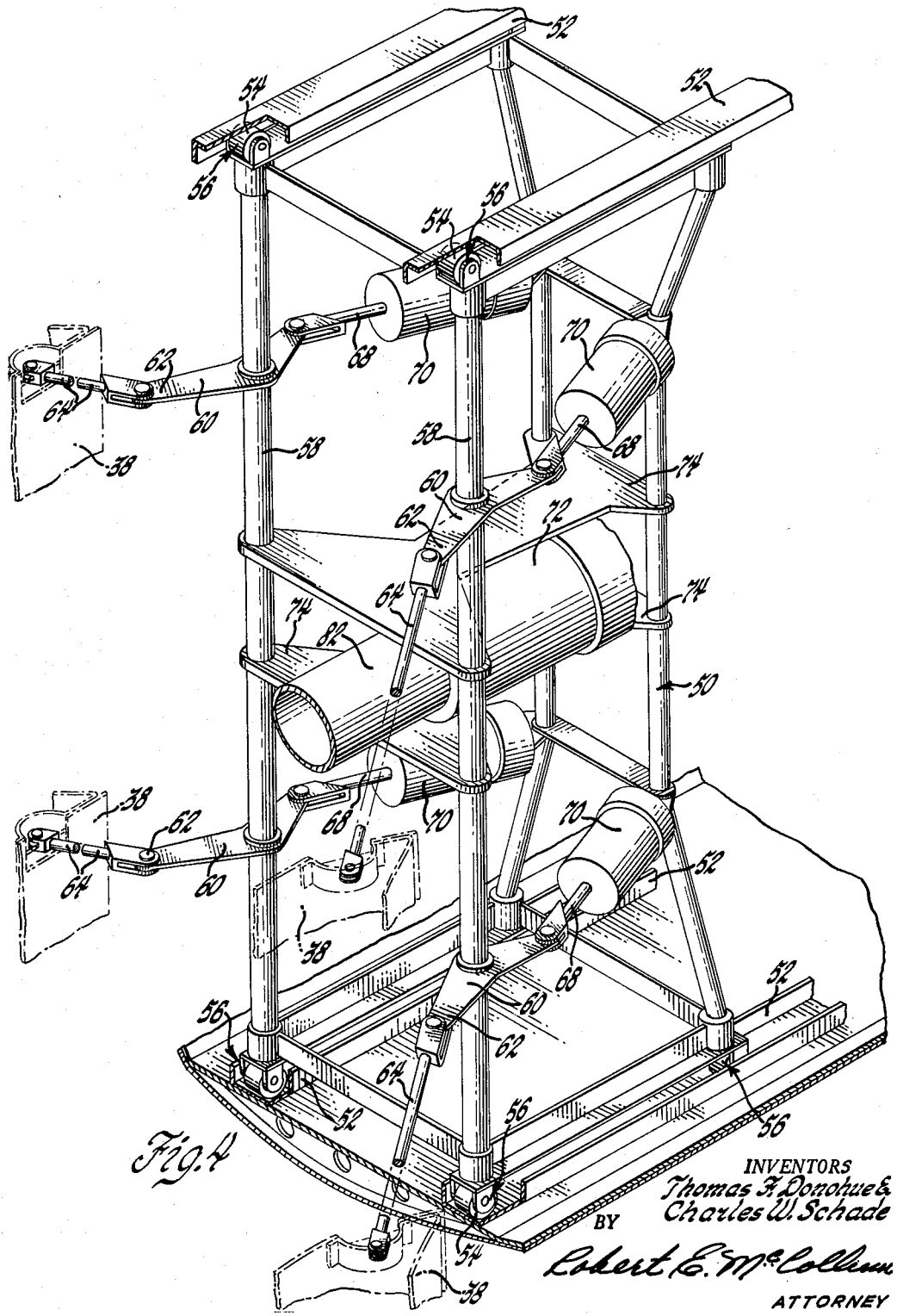

United States Patent Office 3,137,129
Patented June 16, 1964

3,137,129
CLUSTERED ENGINE INLET
Thomas F. Donohue, Cincinnati, Ohio, and Charles W. Schade, Indianapolis, Ind., assignors to General Motors Corporation, Detroit, Mich., a corporation of Delaware
Filed June 6, 1961, Ser. No. 115,266
5 Claims. (Cl. 60—35.6)

This invention relates to the air inlet of a clustered jet engine power plant, and more particularly to means for controlling the air flow to each of the engines of the cluster.

The clustered engine power plant concept, using single induction and exhaust systems for a cluster of jet engines, has been advocated in place of a single large engine. Such use, however, poses problems with respect to the air flow through the inlet if one or more engines becomes inoperative during flight. To provide for maximum performance, recirculation of the exhaust gases through an inoperative engine must be prevented. This invention therefore relates to apparatus for closing the individual inlet duct of an inoperative engine of a clustered engine power plant.

Supersonic aircraft engines generally have air bleed vents or by-pass ducts downstream of the inlet to automatically dump overboard air that is in excess of what the inlet can handle under particular operating conditions. In a clustered engine powerplant, each engine may have its own individual air by-pass duct with a door movably controlled automatically by a central control system to prevent airflow mismatching of the engines.

Therefore, it is an object of this invention to provide a clustered engine inlet construction wherein the means variably controlling the flow of air through the bleed vents also are used to shut off the individual flow to one or more inoperative engines and simultaneously discharge overboard all of the air the individual inlet can handle.

It is a further object of the invention to provide a jet engine air by-pass construction such that the air by-pass door is variably movable to bleed air from the inlet duct of the engine as well as to completely close the inlet duct upon failure of the engine.

Other objects, features and advantages will become apparent upon reference to the succeeding detailed description of the invention and to the drawings illustrating the preferred embodiment thereof; wherein, FIGURE 1 is a perspective view of a portion of the inlet of a clustered engine embodying the invention, with parts broken away and in section;

FIGURE 2 is an enlarged plan view of a portion of the FIG. 1 construction illustrating the invention in one position of operation and taken on a plane indicated by and viewed in the direction of arrows 2—2 of FIG. 1;

FIGURE 3 is a plan view similar to FIG. 2 indicating the parts in their relative positions during another phase of operation; and, FIGURE 4 is a perspective view of details of the invention.

In general, the invention is concerned with a clustered engine inlet control apparatus that normally gang-controls the movement of all of the individual air by-pass doors; but, however, permits individual control to prevent engine mismatching, and permits the individual movement of any one of the doors to close the air inlet duct associated with it in the event of a failure of one or more of the engines during flight. This is accomplished by a reciprocating trolley apparatus located coaxially within the inlet, with bellcrank connections to each of the doors. Translation of the trolley and bellcranks as a unit, without relative rotation of the bellcranks, partially opens or closes all the doors simultaneously. Individual rotation of a particular one of the bellcranks at any time can independently rotate the by-pass door to which it is connected to other positions, including a position completely blocking off the inlet duct to that engine. In this latter position, all of the air in the inlet duct for that engine is by-passed.

More specifically, FIG. 1 shows schematically the air inlet portion 10 of a clustered engine aircraft power plant of the air breathing type. In this instance, there are four lightweight gas generators or engines 12 clustered symmertically about a common gear box and clutch housing 14. The gear box and housnig is driven through suitable gearing (not shown) by each engine by radial shafts (not shown) extending through a strut 16 in the inlet housing of each engine. The details of the engines 12 per se are not given since they are known and are believed to be unnecessary for an understanding of the present invention. The number of the engines, of course, can be more or less than that shown, and the positioning can be varied without departing from the scope of the invention. For example, four side-by-side engines could be used, or three engines arranged triangularly.

In this installation, the air for the engines is received in the inlet opening 18, which initially is square in cross section. The opening is split vertically by a two step ramp consisting of a fixed ramp or wedge 20 pivotally connected to a second variably movable (not shown) ramp 22. This divides the flow to a pair of engines 12 on either side of the gear box and clutch housing.

The second ramp, together with the faired inner wall 24 of the inlet casing, defines a supersonic converging diffuser passage 26 and a subsonic diverging diffuser passage 28. The inlet is further subdivided or partitioned on each side in the region of the subsonic diffuser passage 28 by a flow splitter panel 30. Each of the panels 30 has two flat leading edge portions 31 that flare out longitudinally into individual air inlet ducts 32. Each of the flat portions of the panels is secured to the outer wall 34 of the inlet casing and extends through a cutout (not shown) in the inner faired wall 24 and a slot 36 in the ramp 22. The wall of the ducts 32 mates with the inner faired wall 24 of the inlet casing to provide the proper passage shape. The diffuser ducts in the vicinity of these panels is rectangular in cross section. It is at this point on the inlet casing that the inner and outer inlet casing walls 24 and 34 and the individual duct walls are cut to accommodate air by-pass doors 38 for each of the engines.

As seen more clearly in FIGS. 2 and 3, the doors 38 are formed of sheet metal having a two-dimensional crescent shape, and are hinged along one edge 40 to support fairing 42 forming one wall of a by-pass duct 44. The duct 44 is suitably enclosed on its other three sides by other fairing members 46 (only one shown). The inner surface 48 of each door 38 is shaped to conform to the diffuser passage 28 at this point and mate with the inlet casing wall 24 and duct 32.

Each of the doors 38 is normally rotated between the solid line position of FIG. 2 and the solid line position of FIG. 3 to bleed air from the diffuser duct 28. These positions represent the normal extreme movements of the doors between zero and maximum air bleeding during normal operation of the engine 12 associated with each door. The maximum bleed position is determined in accordance with a predetermined design schedule.

In the event of a failure of any one or more of the engines with the remaining engines being operative, the by-pass door 38 of the inoperative engine is adapted to be rotated or swung beyond its normal full open position (full lines, FIG. 3) to the dotted line position indicated in FIG. 2. The door then completely blocks off the flow of air to the engine 12 in that duct, and discharges all the incoming air outboard of the inlet casing through duct 44.

While the details are not shown, the inlet duct wall for each engine would be provided with a latching mechanism to engage the leading edge of the by-pass door and lock it in position after the door has moved to completely block the duct.

The control means to effect the proper movements of doors 38 will now be described. As stated previously, the doors are normally gang-controlled to bleed approximately the same quantity of air from all the engines, since mismatching of the individual engine airflows due to engine variations and change of attitude of the inlet during flight maneuvers is not generally critical. If mismatching becomes a factor, however, each door can be vernier-controlled independently of the others to match engine airflows. Each of the doors is normally actuatable, however, independently of the others upon an emergency failure signal from its engine to completely close off the particular inlet duct for that engine and by-pass all the flow entering that duct through the by-pass.

The control means to accomplish the above objectives is shown in FIGS. 2 and 3 and more clearly in FIG. 4.

As stated previously, the control apparatus consists essentially of a carriage or trolley translatably mounted for movement along the engine axis, with bell crank levers pivoted on the carriage and pivotally connected to the by-pass doors.

As seen in FIG. 4, a carriage 50, having a skeleton type box frame, is mounted coaxially within the engine casing in four tracks 52. The tracks extend parallel to the engine axis and are mounted on the top and botom portions of the inlet ducting in the space between the walls of the second ramp 22 and the four engines. The tracks are each channel shaped in cross section and slidably receive the roller 54 of a roller assembly 56 secured to each of the four corners of the carriage.

Pivotally mounted on the two upstream carriage frame members 58 are four bell crank levers 60, one adjacent each corner. Each of the bell cranks is pivotally connected at one end 62 to an actuating rod 64 which extends across the individual inlet duct 32 through a slot 66 in the wall, and is pivotally secured to a by-pass door 38. The opposite end of each of the bell cranks 60 is pivotally connected to a piston rod 68 fixed to a hydraulically operated piston (not shown) movable in a cylinder 70. Each of the cylinders 70 is pivotally secured to the carriage frame and has suitable fluid inlet and outlet ports and hose connections (not shown) to supply actuating fluid to opposite sides of the piston to move it in opposite directions. Each of the bell cranks 60 can be individually rotated about the frame member by its piston rod for individual variable movement of the particular by-pass door 38 associated with it for airflow matching, or to completely close the inlet duct of an inoperative engine, as will be described later.

The carriage 50 is reciprocated to open or close all the by-pass doors simultaneously by a longitudinally extending cylinder 72. Cylinder 72 is welded or otherwise secured to two plates 74 secured to the carriage frame, and is slidable on a piston 76 (dotted lines, FIGS. 2 and 3) contained in the cylinder. Piston 76 is secured to a sleeve 82 fixed to a stationary part (not shown) of the inlet ducting. The cylinder is fitted with fluid inlet and exit lines (not shown) so that introduction of fluid to opposite sides of the piston will translate the cylinder and therefore the carriage along the engine axis in one direction or the other. The movement of the carriage, therefore, translates all of the bell cranks as a unit from the FIG. 2 position to the FIG. 3 position, or vice versa, rotating all the by-pass doors simultaneously from the closed full line position of FIG. 2 to the full open by-pass position of FIG. 3.

It will be clear, however, that for engine airflow matching purposes, any one of the by-pass doors 38 can be vernier-controlled by the separate movement of its bell crank and piston rod at any time to rotate the door to a position slightly different from that shown, i.e., the by-pass door can be opened to by-pass air prior to the other by-pass doors being opened, etc.

All of the controls and fluid connections, etc., for causing separate or simultaneous actuation of the cylinders and piston are not shown since they are known and are believed to be unnecessary for an understanding of the invention. Suffice it to say, however, that the main control system would receive suitable signals from pressure probes or other sensing devices located in the individual inlet ducts and/or other locations for signaling the control for either individual actuation of a particular one or ones of the by-pass doors, or for simultaneous movement of all the doors. An emergency signal activated by a failure signal from one of the engines would signal the control to completely close the inlet duct to that engine.

In operation, therefore, each engine receives its own air supply through its duct 32, and its by-pass door 38 is initially positioned as shown in FIG. 2 in full lines. As soon as air bleeding is required or a change is necessary, and if airflow mismatching is not critical, the carriage 50 is actuated to open all the by-pass doors simultaneously, the degree of opening depending upon the flight and other conditions. If noticeable engine mismatching occurs, the individual engine by-pass doors may be rotated to open the door more or less than the others to by-pass more or less air than the others by signaling its particular actuating cylinder and piston. If maximum by-passing of air of all engines is desired, the by-pass doors are moved to the full line positoin of FIG. 3 partially blocking the inlet duct. This position, of course, is predetermined in accordance with the design schedule flow of air to the engine to produce maximum thrust and efficiency of operation.

Upon receiving a failure signal from an engine that is either inoperative or in the process of being shut down, the door for that particular engine is rotated immediately to the dotted line position of FIG. 2 by rotating the bell crank lever associated with it to the dotted line position to completely close the inlet duct and by-pass all the air out through duct 44. The recirculation of gas through the inoperative engine, therefore, is prevented. It is to be noted that the pivotal connection between the end 62 of each of the bell crank levers and the actuating rod 64 is provided with a shear pin (not shown) to prevent damage to the door when it is completely closed.

From the foregoing, therefore, it will be seen that the invention provides a clustered jet engine construction providing not only the simultaneous by-passing of a portion of the air from all engines to obtain maximum operating efficiency, but also, individual actuation of the by-passing means for each engine of the cluster for engine airflow matching purposes, as well as automatically by-passing all air past any inoperative engines.

While the invention has been illustrated in its preferred embodiment in the drawings, it will be clear to those skilled in the art to which the invention pertains that many modifications may be made thereto without departing from the scope of the invention.

We claim:

1. In combination, a plurality of fluid jet propelled engines each having a fluid inlet duct, a fluid by-pass duct connected thereto, and by-pass means closing said by-pass duct and variably movable into said inlet duct to positions variably bleeding fluid therefrom into said by-pass duct, common means moving all of said by-pass means simultaneously, each of said by-pass means in its open position during normal operation of the engine associated therewith partially closing said inlet duct, and means moving one of said by-pass means independently of the others beyond its open position to completely block fluid flow through the inlet duct associated therewith upon shutdown of its associated engine.

2. In combination, a plurality of fluid jet propelled engines each having a fluid inlet duct, a fluid by-pass duct connected thereto, and by-pass door means closing said by-pass duct and variably pivotally movable into its inlet duct to positions variably bleeding fluid therefrom into said by-pass duct, means common to all of said engines moving all of said by-pass means simultaneously, each of said by-pass door means in its open position during normal operation of the engine associated therewith partially closing said inlet duct, and actuating means rotatably and reciprocably mounted on said engines and pivotally connected to said door means moving one of said by-pass door means independently of the others beyond its open position to completely block fluid flow through the inlet duct associated therewith upon shut down of its associated engine.

3. A combination as in claim 2, wherein said actuating means and said means common to all of said engines are rotatably secured together and mounted for simultaneous reciprocation.

4. In combination, a plurality of fluid jet propelled engines each having a fluid inlet duct, a fluid by-pass duct connected thereto, and by-pass door means closing said by-pass duct and variably pivotally movable into its inlet duct to positions variably bleeding fluid therefrom into said by-pass duct, means common to all of said engines moving all of said by-pass means simultaneously, each of said by-pass door means in its open position during normal operation of the engine associated therewith partially closing said inlet duct, a plurality of actuating means each rotatably and reciprocably mounted on said engines and pivotally connected to and moving one of said by-pass door means independently of the others beyond its open position to completely block fluid flow through the inlet duct associated therewith upon shut-down of its associated engine.

5. In combination, a plurality of fluid jet propelled engines each having a fluid inlet duct, a fluid by-pass duct connected thereto, and by-pass door means pivotally connected to the engine and closing said by-pass duct and variably rotatable into its inlet duct to positions variably bleeding fluid therefrom into said by-pass duct, means common to all of said engines moving all of said by-pass means simultaneously, each of said by-pass door means in its open position during normal operation of the engine associated therewith partially closing said inlet duct, a plurality of actuating means each moving one of said by-pass door means independently of the others beyond its open position at any time to completely block fluid flow through the inlet duct associated therewith upon shutdown of its associated engine, all of said actuating means being rotatably secured to said means common to all of said engines for a simultaneous reciprocable and unitary movement regardless of the rotative positions of any of the by-pass door means.

References Cited in the file of this patent

UNITED STATES PATENTS

| | | |
|---|---|---|
| 2,667,185 | Beavers | Jan. 26, 1954 |
| 2,679,991 | Eagon | June 1, 1954 |
| 2,696,079 | Kappus | Dec. 7, 1954 |
| 2,960,821 | Scherl | Nov. 22, 1960 |
| 2,973,921 | Price | Mar. 7, 1961 |